(12) United States Patent
Liu et al.

(10) Patent No.: US 12,464,494 B2
(45) Date of Patent: Nov. 4, 2025

(54) PAGING MECHANISM FOR WIRELESS COMMUNICATION NETWORKS

(71) Applicant: ZTE Corporation, Guangdong (CN)

(72) Inventors: Xu Liu, Guangdong (CN); Bo Dai, Guangdong (CN); Xiubin Sha, Guangdong (CN)

(73) Assignee: ZTE Corporation, Shenzhen (CN)

( * ) Notice: Subject to any disclaimer, the term of this patent is extended or adjusted under 35 U.S.C. 154(b) by 352 days.

(21) Appl. No.: 17/681,328

(22) Filed: Feb. 25, 2022

(65) Prior Publication Data

US 2022/0182974 A1 Jun. 9, 2022

Related U.S. Application Data

(63) Continuation of application No. PCT/CN2020/093405, filed on May 29, 2020.

(51) Int. Cl.
*H04W 68/02* (2009.01)
*H04W 60/04* (2009.01)
*H04W 68/00* (2009.01)
*H04W 72/50* (2023.01)

(52) U.S. Cl.
CPC .......... *H04W 68/02* (2013.01); *H04W 60/04* (2013.01); *H04W 68/005* (2013.01); *H04W 72/535* (2023.01)

(58) Field of Classification Search
CPC ... H04W 68/02; H04W 60/04; H04W 68/005; H04W 72/535; H04W 8/02; H04W 48/08; H04W 76/28; Y02D 30/70; H04B 17/318
See application file for complete search history.

(56) References Cited

U.S. PATENT DOCUMENTS

| 2016/0205661 A1* | 7/2016 | Ryu .................... H04W 68/02 455/458 |
| 2017/0280481 A1* | 9/2017 | Stern-Berkowitz ........................ H04L 1/1854 |
| 2018/0092060 A1* | 3/2018 | Won ..................... H04W 72/51 |
| 2018/0160298 A1* | 6/2018 | Wang ................... H04M 7/006 |
| 2018/0176847 A1* | 6/2018 | Fasil Abdul .......... H04W 76/10 |
| 2018/0227880 A1* | 8/2018 | Su ......................... H04W 68/02 |
| 2018/0263012 A1 | 9/2018 | Ryu et al. |

(Continued)

FOREIGN PATENT DOCUMENTS

| CN | 106961729 A | 7/2017 |
| CN | 107211393 A | 9/2017 |

(Continued)

OTHER PUBLICATIONS

Extended European Search Report for European Patent Application No. 20894950.3, mailed Jul. 26, 2022 (15 pages).

(Continued)

*Primary Examiner* — Yu-Wen Chang
(74) *Attorney, Agent, or Firm* — Perkins Coie, LLP

(57) ABSTRACT

Methods, apparatus, and systems for a paging scheme based on a coverage level are disclosed. In one example aspect, the method includes receiving, by a first communication node, assistant information for a first paging scheme from a third communication node and transmitting one or more paging messages to a second communication node based on a paging scheme selected between the first paging scheme and a second paging scheme according to the assistant information.

22 Claims, 19 Drawing Sheets

(56) References Cited

U.S. PATENT DOCUMENTS

| | | | |
|---|---|---|---|
| 2018/0269962 A1* | 9/2018 | Liu | H04B 7/0689 |
| 2019/0110241 A1* | 4/2019 | Jain | H04W 4/70 |
| 2020/0008063 A1* | 1/2020 | Selvaganapathy | H04W 48/12 |
| 2020/0029301 A1* | 1/2020 | Li | H04W 76/11 |
| 2020/0245396 A1* | 7/2020 | Dhanda | H04W 68/02 |
| 2021/0227495 A1* | 7/2021 | Berggren | H04W 68/04 |
| 2022/0022159 A1* | 1/2022 | Johansson | H04W 68/02 |
| 2022/0046586 A1* | 2/2022 | Dhanda | H04W 48/18 |

FOREIGN PATENT DOCUMENTS

| | | | | |
|---|---|---|---|---|
| EP | 3 582 561 A1 | 12/2019 | | |
| WO | 2016/186416 A1 | 11/2016 | | |
| WO | WO-2019232732 A1 * | 12/2019 | | H04W 68/005 |
| WO | 2020/024278 A1 | 2/2020 | | |

OTHER PUBLICATIONS

Examiner's Requisition for Canadian Patent Application No. 3,156,845, mailed May 17, 2023 (7 pages).

International Search Report and Written Opinion mailed on Feb. 25, 2021 for International Application No. PCT/CN2020/093405, filed on May 29, 2020 (6 pages).

Nokia Networks, "Paging of Rel13 low complexity UE and/or UE in EC mode," 3GPP TSG RAN WG2 Meeting #92, Anaheim, USA, R2-156442, 4 pages, Nov. 16-20, 2015.

Nokia Networks, "Paging of Rel13 low complexity UE and/or UE in EC mode," 3GPP TSG RAN WG2 Meeting #91bis, Malmö, Sweden, R2-154550, 4 pages, Oct. 5-9, 2015.

Huawei et al., "Paging optimisation," 3GPP TSG-RAN3 Meeting #89bis, Sophia-Antipolis, France, R3-151903, 3 pages, Oct. 5-9, 2015.

First Examination Report for Indian Patent Application No. 202247011893, mailed Jan. 25, 2023 (7 pages).

Examiner's Requisition for Canadian Patent Application No. 3, 156,845, mailed Feb. 29, 2024 (4 pages).

Office Action for Chinese Patent Application No. 202080067523.1, mailed Jul. 18, 2024 (20 pages).

Communication pursuant to Article 94(3) EPC for European Patent Application No. 20894950.3, mailed Nov. 4, 2024 (15 pages).

Office Action for Chinese Patent Application No. 202080067523.1, mailed Nov. 21, 2024 (20 pages).

Hearing Notice for Indian Patent Application No. 202247011893, mailed Feb. 3, 2025 (4 pages).

Office Action for Korean Patent Application No. 10-2022-7009956, mailed Mar. 10, 2025 (22 pages).

Examiner's Requisition for Canadian Patent Application No. 3,156,845, mailed Mar. 18, 2025 (18 pages).

Notice of Allowance for Chinese Patent Application No. 202080067523. 1, mailed Feb. 14, 2025 (4 pages).

* cited by examiner

PAGING MECHANISM FOR WIRELESS COMMUNICATION NETWORKS

CROSS REFERENCE TO RELATED APPLICATIONS

This patent document is a continuation of and claims benefit of priority to International Patent Application No. PCT/CN2020/093405, filed on May 29, 2020. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, methods, apparatus, and systems for a paging scheme based on a coverage level of a user device.

In one aspect, a method of wireless communication includes receiving, by a first communication node, assistant information for a first paging scheme from a third communication node, and transmitting one or more paging messages to a second communication node based on a paging scheme selected between the first paging scheme and a second paging scheme according to the assistant information.

In another aspect, a method of wireless communication includes receiving a first paging scheme related configuration from a first communication node, and receiving one or more paging messages based on a paging scheme that is selected among a plurality of paging schemes including the first paging scheme.

In another aspect, a method of wireless communication includes sending assistant information for a first paging scheme to a first communication node.

These, and other, aspects are described in the present document.

DETAILED DESCRIPTION

Certain features are described using the example of Fifth Generation (5G) wireless protocol. However, applicability of the disclosed techniques is not limited to only 5G wireless systems.

5G systems (5GS) include multicast/broadcast services. An aspect of these services is multi-cast discovery and the starting and ending of multicast services. User equipment (UEs) may simultaneously operate using unicast (also referred to as unicast) and multicast services. When a UE moves from one radio access network (RAN) node to another RAN node, service continuity of the broadcast and multicast services is needed. Disclosed herein are techniques for providing continuity of service for broadcast and multicast services.

In a paging mechanism where paging messages are transmitted for the set number of repetitions, paging carriers are configured without considering a coverage level of a particular user device. If the paging carriers are configured corresponding to the coverage level of each user device, the eNB would send paging message for a set number of repetitions according to the coverage level of each user device in the selected paging carrier, which would avoid unnecessary consumption of paging resources that would have been caused by transmitting paging messages for the maximum number of repetitions in each paging carrier causing.

In an example paging mechanism that uses the same paging carrier regardless of the UE's coverage level, parameters that are related to a paging mechanism are cell specific. For example, the paging related parameters such as discontinuous reception (DRX) and a number of paging repetitions (npdcch-NumRepetitionPaging) are configured for each cell.

After selecting a paging carrier based on the formula for paging carrier selection, the eNB sends paging messages for the maximum number of repetitions in each paging carrier. The UE receives paging messages until the maximum number of repetitions is reached.

The coverage level varies depending on the quality of radio environment. In a good radio environment, the UE usually needs less paging repetitions than the configured paging related parameters such as the value of the npdcch-NumRepetitionPaging. Therefore, the repetition of paging transmission by the eNB according to the set value would result in a waste of paging resources.

The methods and systems implemented based on some embodiments of the disclosed technology can avoid unnecessary waste of paging resources by paging the UE for a number of repetitions according to its coverage level.

Figure 1:
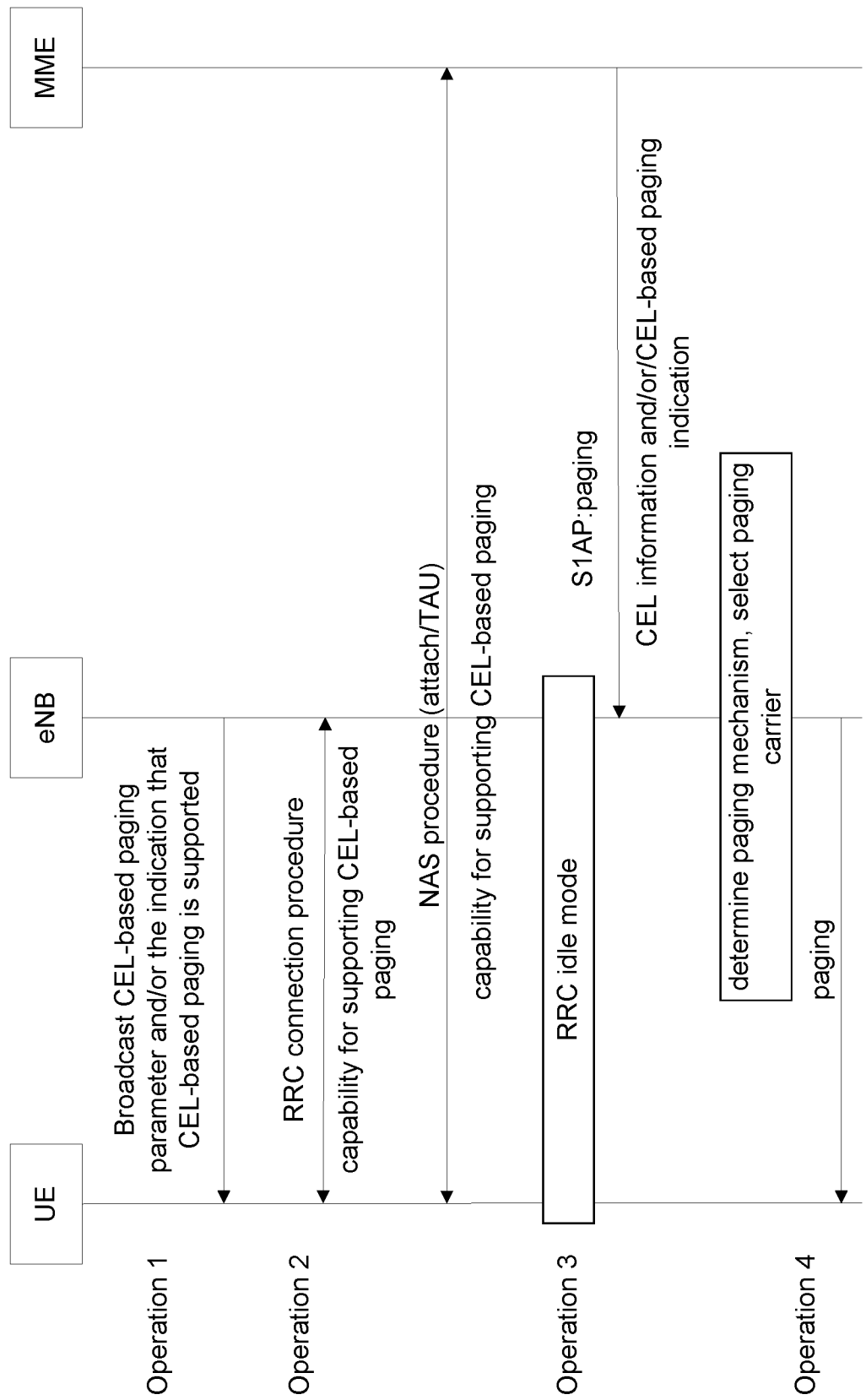
FIG. 1 shows an example of a coverage level based paging scheme based on some example embodiments of the disclosed technology.

FIG. 1 shows an example of a coverage level based paging scheme based on some example embodiments of the disclosed technology.

In some implementations, the coverage level based paging scheme may include the following operations:

Operation 1. If a network node (e.g., eNB) supports the coverage level based paging scheme, it may broadcast parameters associated with the coverage level based paging scheme and/or an indication that the cell supports the coverage level based paging scheme.

Operation 2. A user device (e.g., UE) that supports the coverage level based paging scheme may report capability information via a radio resource control (RRC) establishment procedure or a non-access stratum (NAS) procedure. In both the RRC establishment procedure and the NAS procedure, a mobility management entity (MME) obtains the capability information.

Operation 3. When the UE is released from an RRC idle mode, and when paging is triggered from a core network, the MME may include information associated with the coverage level based paging scheme and/or the indication that a cell or UE supports the coverage level based paging scheme in S1 application protocol (S1-AP) paging message transmitted to eNB if the MME knows the UE supports the coverage level based paging scheme.

Operation 4. If the network node (e.g., eNB) finds the indication that the user device (e.g., UE) supports the coverage level based paging scheme in the S1-AP paging message, and if the network node (e.g., eNB) also supports the coverage level based paging scheme, the network node (e.g., eNB) chooses a paging carrier based on a paging carrier selection mechanism for the coverage level based paging scheme and then sends a paging message on the paging carrier.

Figure 2:
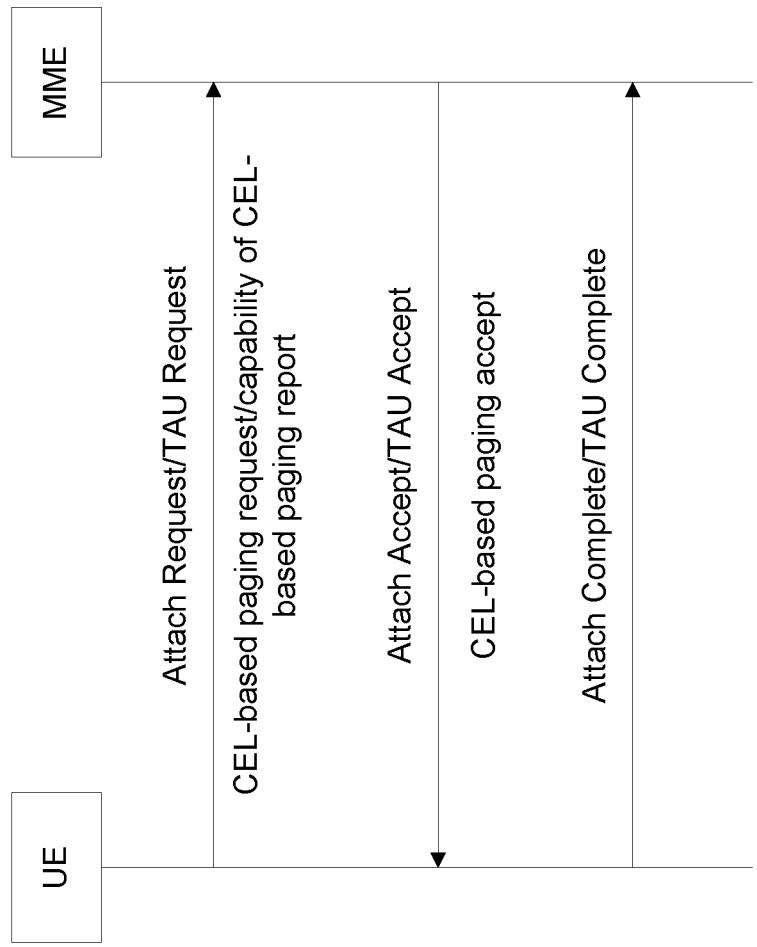
FIG. 2 shows an example of enabling a coverage level based paging scheme using attach request/tracking area update (TAU) request messages based on some example embodiments of the disclosed technology.

FIG. 2 shows an example of enabling a coverage level based paging scheme using attach request/tracking area update (TAU) request messages based on some example embodiments of the disclosed technology.

In some implementations, a user device (e.g., UE) may trigger a coverage level based paging operation by sending a coverage level based paging request and/or a report indicating capability for the coverage level based paging scheme via an NAS procedure (Attach/TAU).

The user device (e.g., UE) triggers coverage level based paging request/capability of coverage level based paging report in Attach Request/TAU Request message based on its mobility characteristics. In some implementations, a stationary user device (e.g., UE) or a low-mobility user device may initiate a coverage level based paging operation. If the MME agrees with the request, it may send the acknowledgment along with Attach Accept/TAU Accept message.

Figure 3:
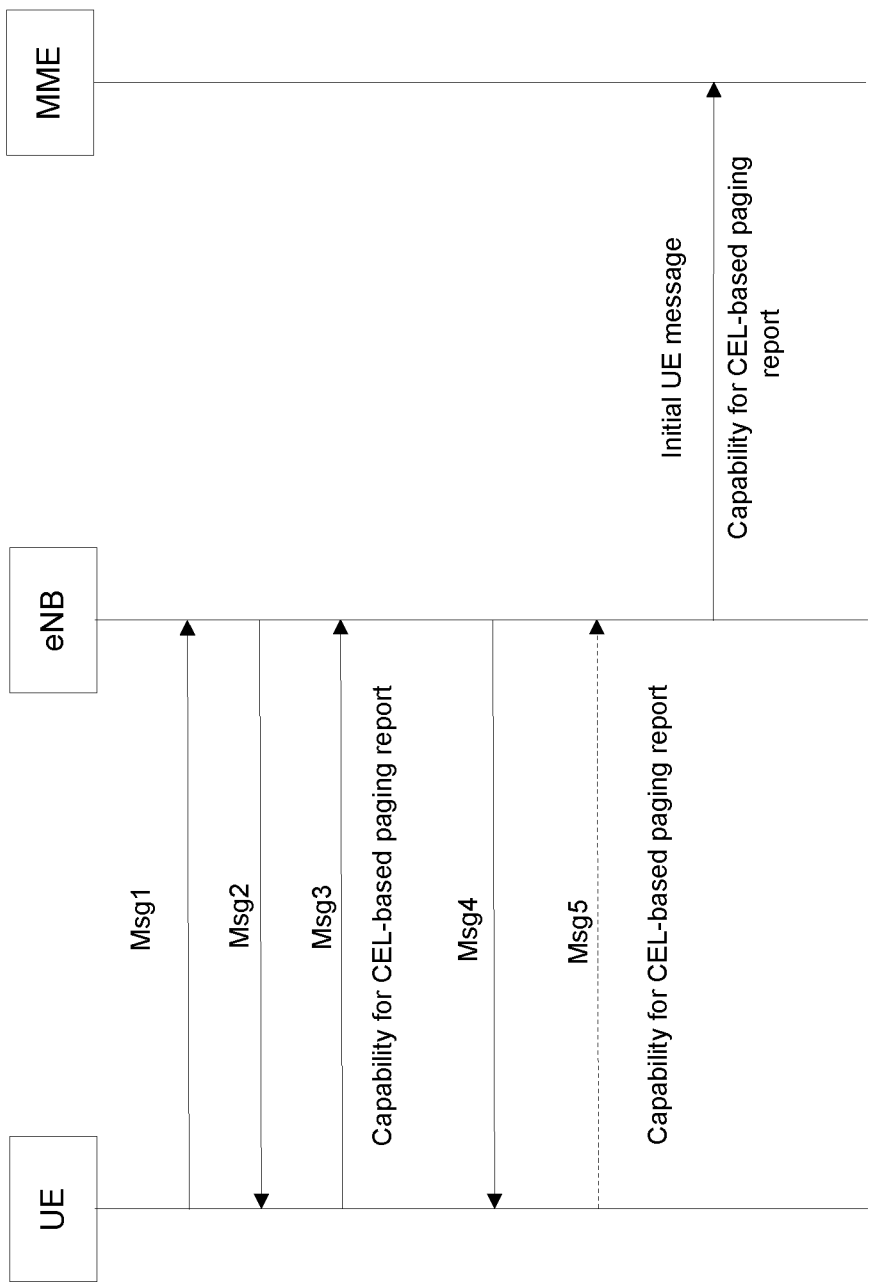
FIG. 3 shows an example of enabling a coverage level based paging scheme using a radio resource control (RRC) establishment procedure based on some example embodiments of the disclosed technology.

FIG. 3 shows an example of enabling a coverage level based paging mechanism using a radio resource control (RRC) establishment procedure based on some example embodiments of the disclosed technology.

In some implementations, a user device (e.g., UE) provides a report indicating capability for the coverage level based paging scheme via the procedure of RRC establishment.

The user device (e.g., UE) transmits the capability information through Msg3/Msg5 and the network node (e.g., eNB) may transmit the capability information to the MME through an initial UE message.

Figure 4:
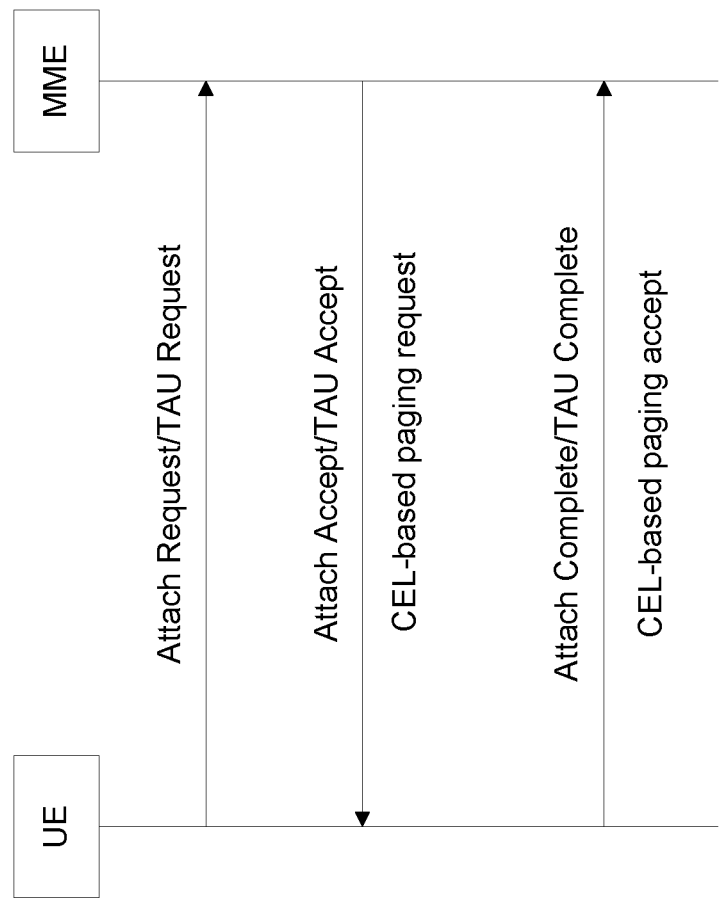
FIG. 4 shows an example of enabling coverage level based paging scheme using a non-access stratum (NAS) procedure based on some example embodiments of the disclosed technology.

FIG. 4 shows an example of enabling coverage level based paging mechanism using a non-access stratum (NAS) procedure based on some example embodiments of the disclosed technology.

A mobility management entity (MME) triggers a request for the coverage level based paging operation via an NAS procedure (Attach/TAU).

The MME triggers the coverage level based paging request based on the mobility characteristics of the user device (e.g., UE) in Attach Accept/TAU Accept message. For a stationary UE or a low-mobility UE, the MME may initiate the coverage level based paging operation. If the UE accepts the request, the UE may transmit the acknowledgment information through Attach Complete/TAU Complete message.

Figure 5A:
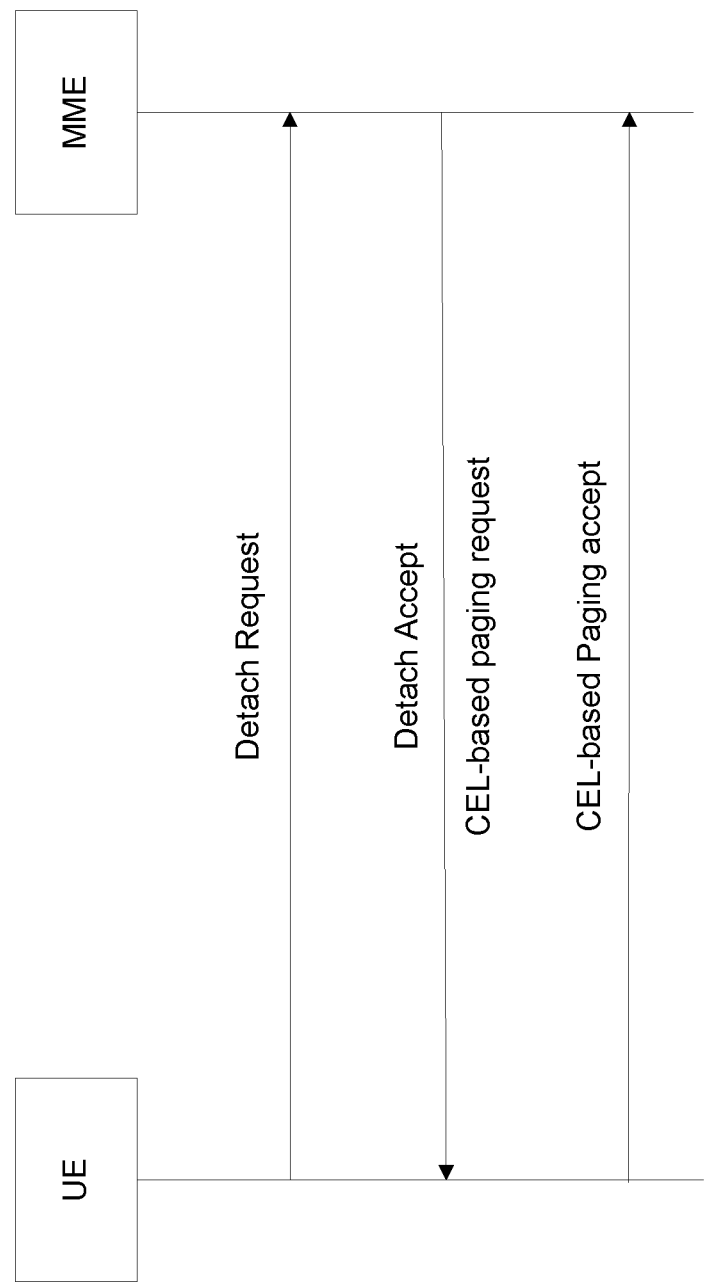
FIGS. 5A and 5B show examples of a coverage level based paging scheme including detach request/detach accept messages based on some example embodiments of the disclosed technology.
Figure 5B:
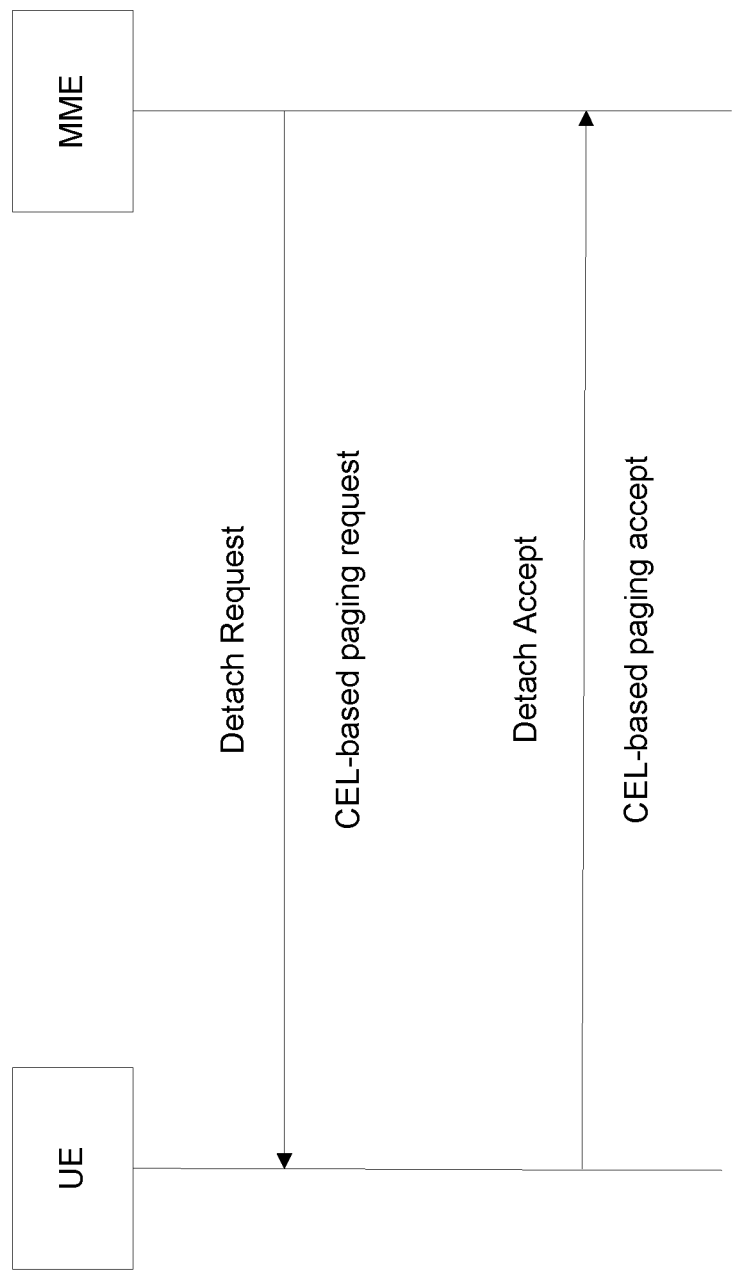

FIGS. 5A and 5B show examples of a coverage level based paging mechanism including detach request/detach accept messages based on some example embodiments of the disclosed technology.

The MME triggers a request for the coverage level based paging via an NAS procedure (Detach).

In a detach procedure triggered by a user device (e.g., UE), the MME triggers Coverage level based paging request in Detach Accept message based on the mobility characteristics of the user device (e.g., UE). For a stationary UE or a low-mobility UE, the MME may trigger the coverage level based paging operation. The UE sends the acknowledgment information to the MME.

In a detach procedure triggered by the MME, the MME triggers the coverage level based paging request in Detach Request message based on the mobility characteristics of the UE. For a stationary UE or a low-mobility UE, the MME may trigger the coverage level based paging operation. The UE sends an acknowledgment via the Detach Accept message to the MME.

Figure 6:
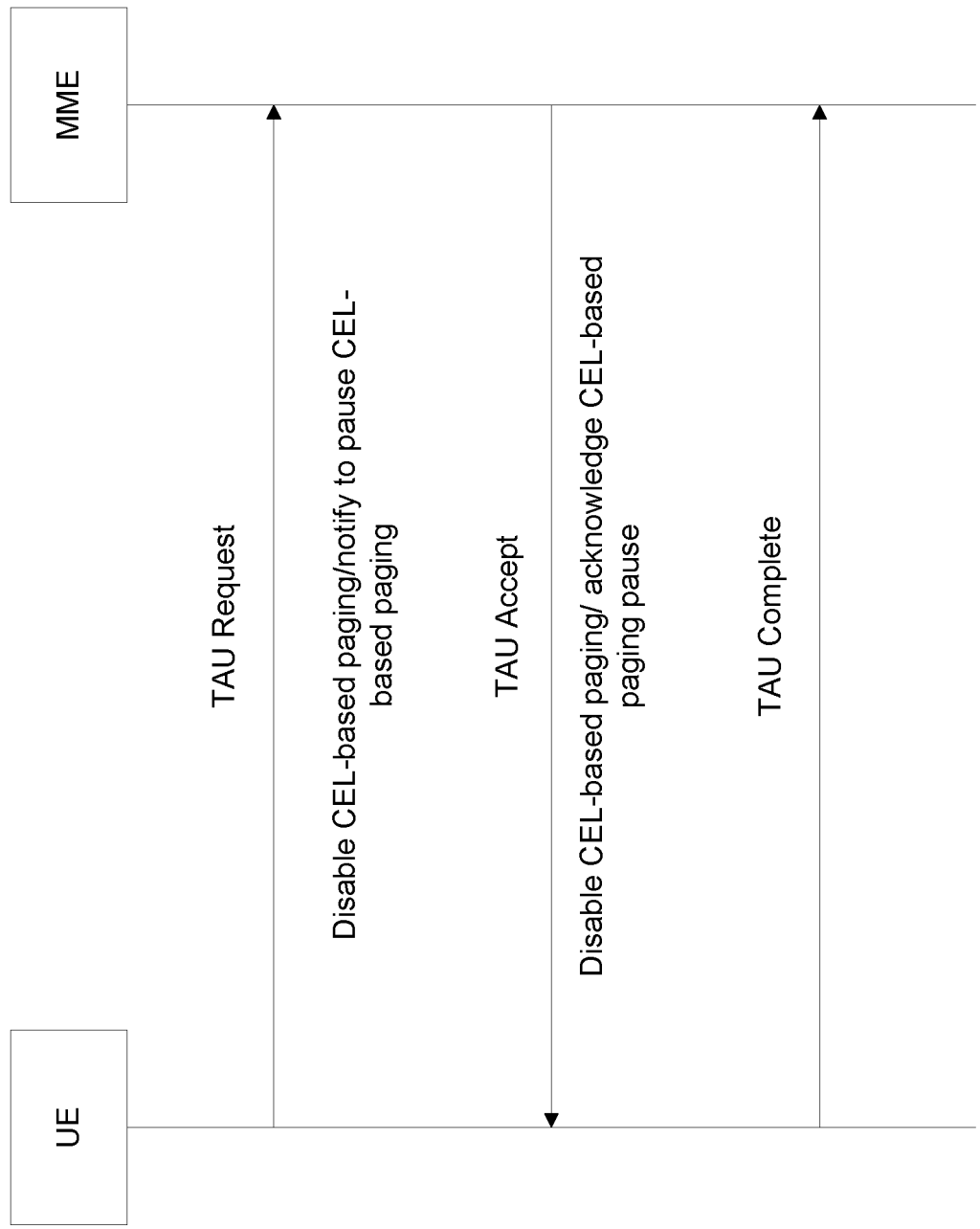
FIG. 6 shows an example of disabling a coverage level based paging scheme based on some example embodiments of the disclosed technology.

FIG. 6 shows an example of disabling a coverage level based paging scheme based on some example embodiments of the disclosed technology.

A user device (e.g., UE) triggers a disablement of the coverage level based paging scheme and/or sends a notification for pausing the coverage level based paging operation via a TAU procedure.

The user device (e.g., UE) provides information for disabling the coverage level based paging scheme and/or transmits a notification for pausing the coverage level based paging operation via a TAU request message and the MME transmits an acknowledgment via a TAU accept message.

Figure 7A:
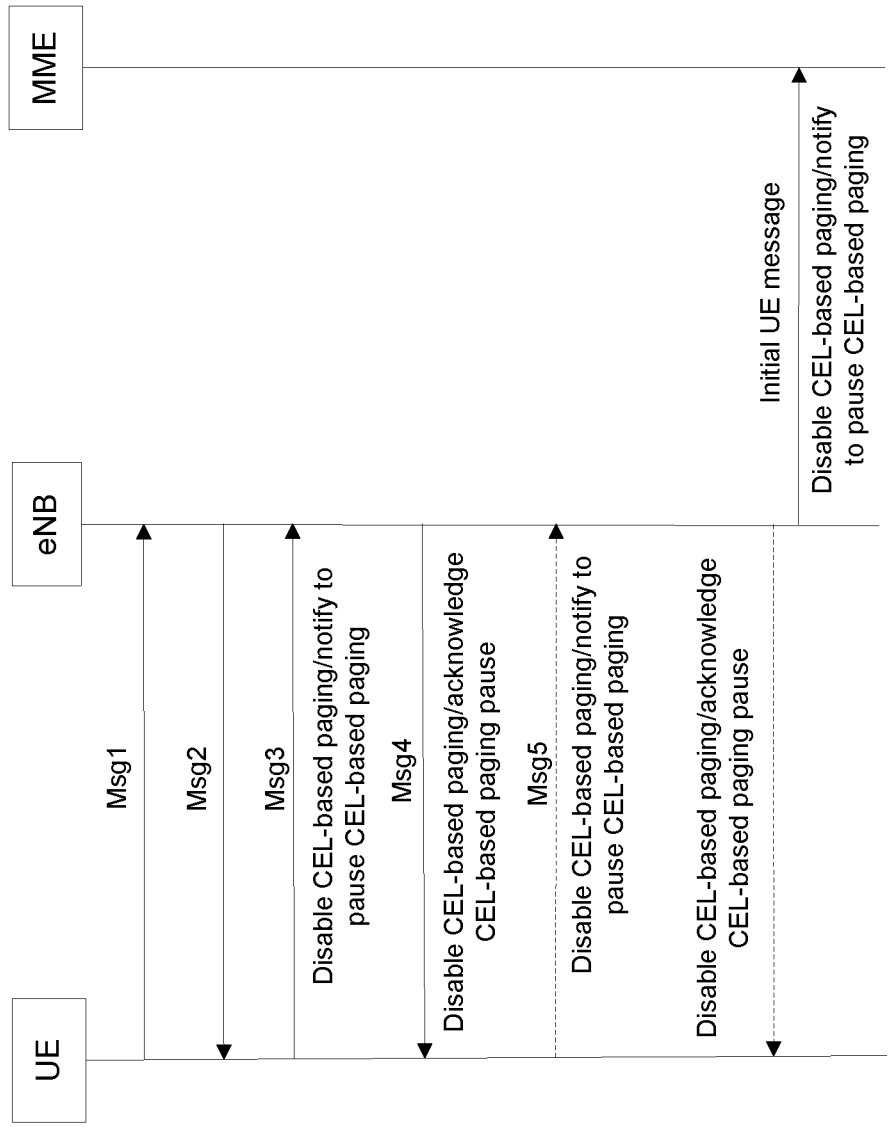
FIGS. 7A and 7B show examples of disabling a coverage level based paging scheme including an RRC establishment procedure based on some example embodiments of the disclosed technology.
Figure 7B:
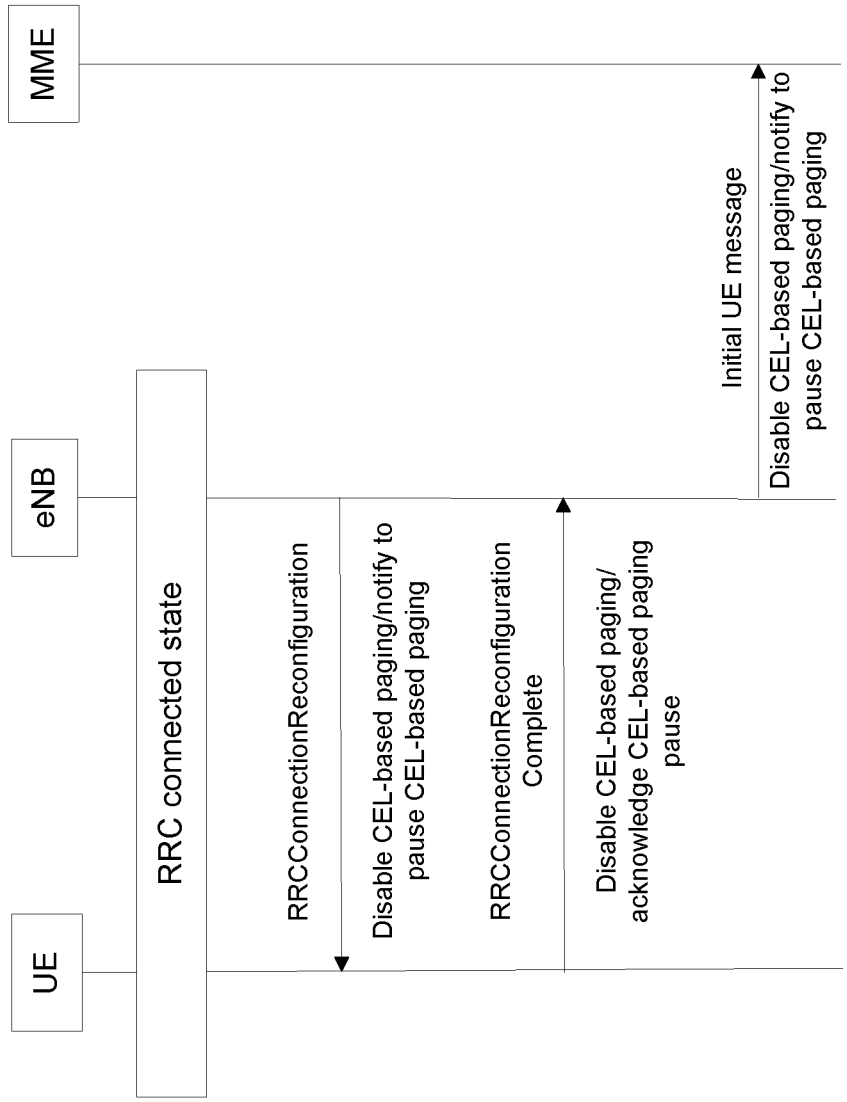

FIGS. 7A and 7B show examples of disabling a coverage level based paging mechanism including an RRC establishment procedure based on some example embodiments of the disclosed technology.

A user device (e.g., UE) triggers a disablement of the coverage level based paging scheme and/or sends a notification for pausing the coverage level based paging operation via an RRC establishment procedure.

In an implementation, the UE provides information for disabling the coverage level based paging scheme and/or sends a notification for pausing the coverage level based paging operation via Msg3, Msg5 in the RRC establishment procedure.

A network node (e.g., eNB) acknowledges the reception of the information and/or notification via a subsequent RRC message (e.g., RRCConnectionReestablishment/RRCConnectionReconfiguration) or a message associated with a downlink data transmission or a new individual signaling. Subsequently, the eNB forwards the information associated with the disablement of the coverage level based paging scheme and/or the notification for pausing the coverage level based paging operation via an initial UE message.

In another implementation, in an RRC connected mode, the UE provides the information associated with the disablement of the coverage level based paging scheme and/or the notification for pausing the coverage level based paging operation via an RRC message (e.g., RRCConnectionReconfigurationComplete/RRCConnectionReestablishmentComplete/UECapabilityInformation message) or a message associated with an uplink data transmission. The eNB acknowledges the reception of the information and/or notification via a dedicated message or a message associated with a downlink data transmission. Subsequently, the eNB forwards the information associated with the disablement of the coverage level based paging scheme and/or the notification for pausing the coverage level based paging operation via an initial UE message.

Figure 8:
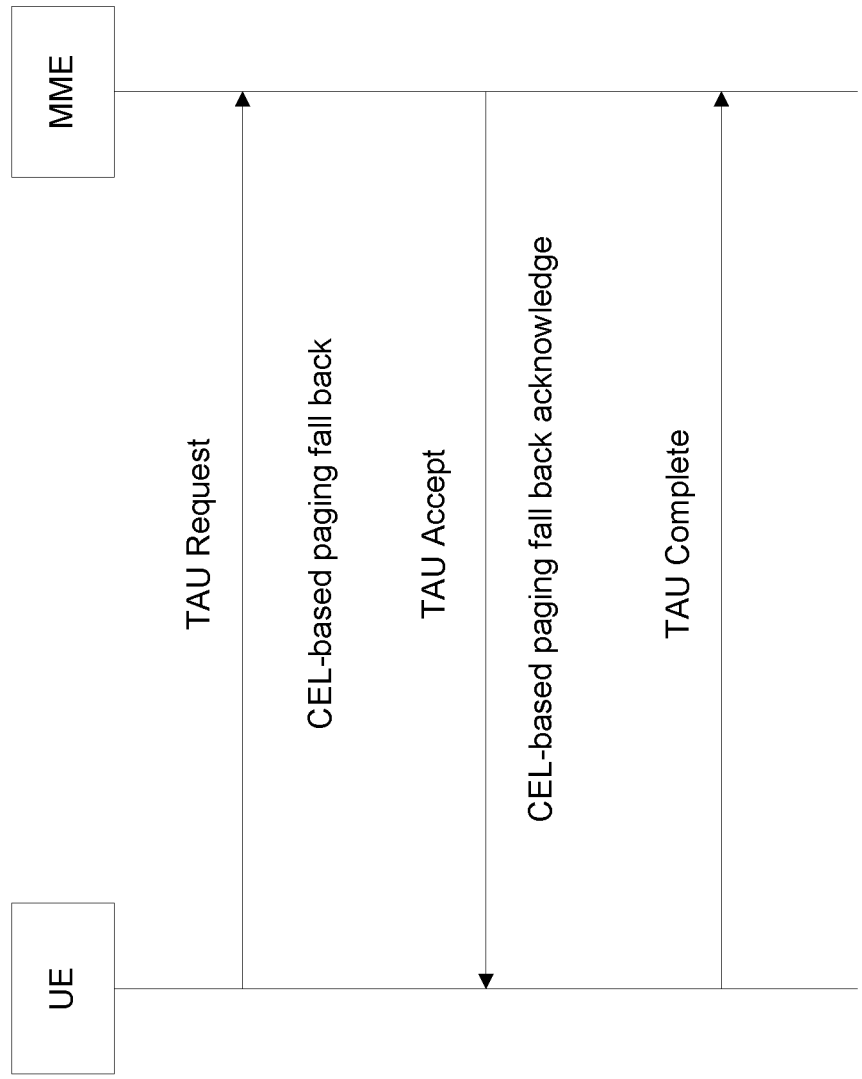
FIG. 8 shows an example of falling back to a legacy paging mechanism from a coverage level based paging scheme based on some example embodiments of the disclosed technology.

FIG. 8 shows an example of falling back to a legacy paging mechanism from a coverage level based paging mechanism based on some example embodiments of the disclosed technology.

A user device (e.g., UE) provides an indication to fall back to a legacy paging scheme via Attach Request/TAU Request message in an NAS procedure (Attach/TAU).

The UE may notify the MME that the UE will transition back to a legacy paging scheme via an Attach Request/TAU Request message, and the MME may acknowledge the reception of the notification via an Attach Accept/TAU Accept message.

Figure 9A:
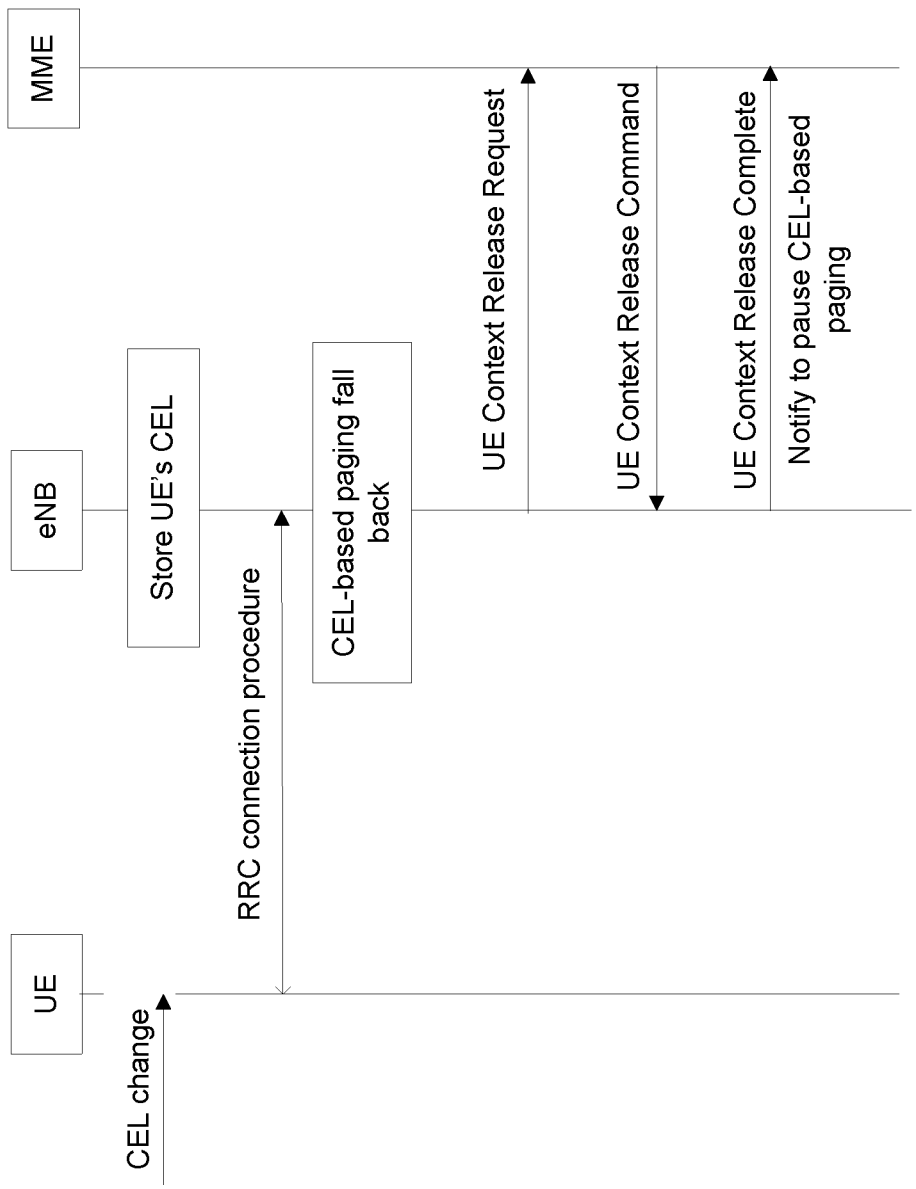
FIGS. 9A and 9B show examples of falling back to a legacy paging scheme from a coverage level based paging scheme using an RRC establishment procedure based on some example embodiments of the disclosed technology.
Figure 9B:
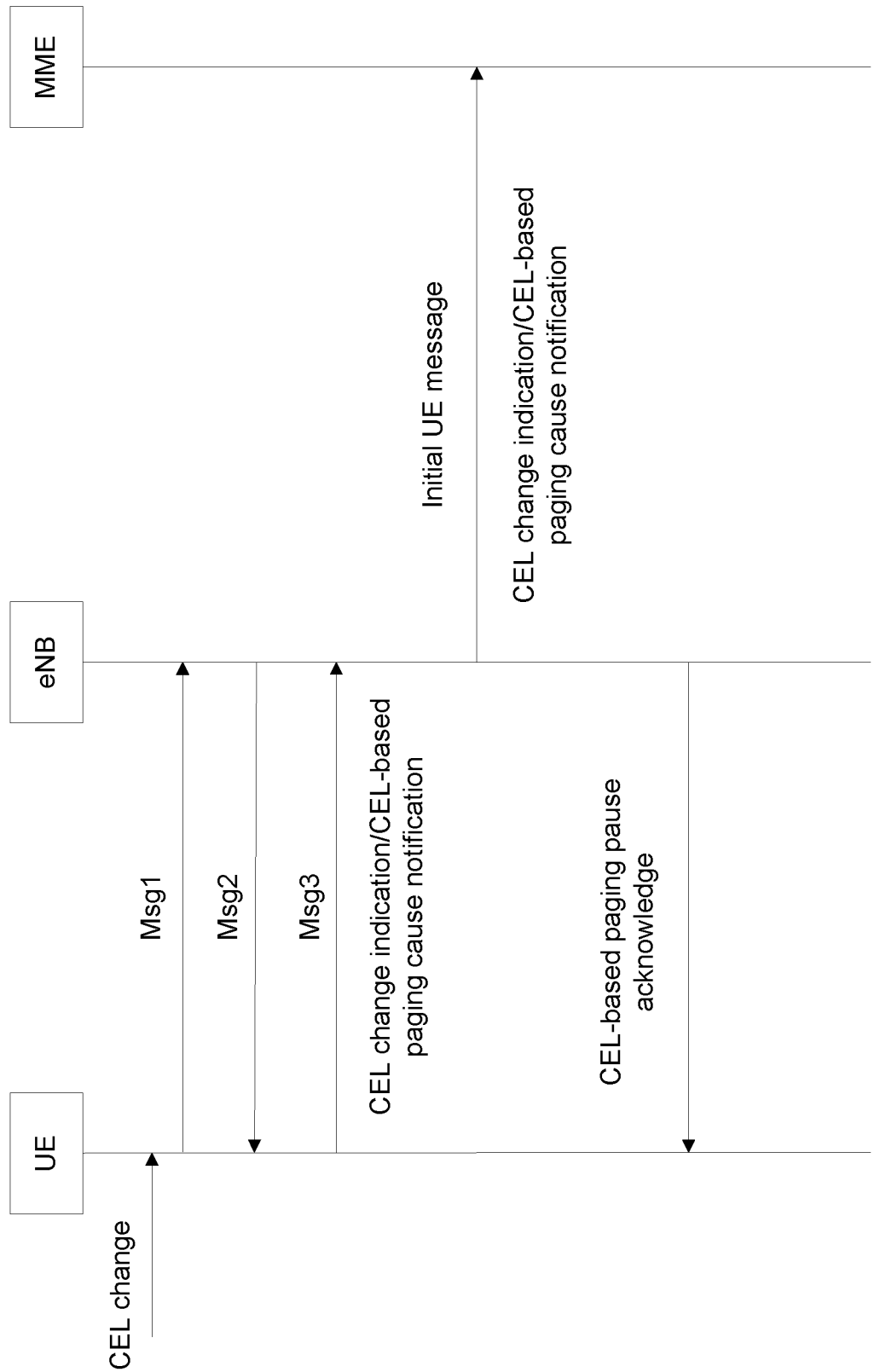

FIGS. 9A and 9B show examples of falling back to a legacy paging mechanism from a coverage level based paging mechanism using an RRC establishment procedure based on some example embodiments of the disclosed technology.

In some implementations, the process of falling back to a legacy paging scheme can be performed via an AS procedure.

In one example, the eNB perceives a change in the coverage level of the UE and triggers the falling back procedure to transition to a legacy paging scheme in an RRC establishment procedure. In the case where the eNB stores the information associated with the coverage level, when the coverage level changes, the UE initiates an RRC establishment, and the eNB perceives the change in the coverage level by receiving Msg1 message and triggers the falling back procedure to transition to a legacy paging scheme. Subsequently, in a release procedure, the eNB provides the notification associated with the falling back procedure to transition to a legacy paging scheme in UE Context Release Request message or in UE Context Release complete message, and the MME acknowledges the reception of the notification via UE Context Release Command message or a new signaling.

In another example, the UE provides an indication associated with the falling back procedure to transition to a legacy paging scheme via Msg3 in EDT procedure. When the coverage level changes, the UE triggers an early data transmission (EDT) procedure and provides the indication associated with the falling back procedure to transition to a legacy paging scheme via Msg3 message, and the eNB acknowledges the completion of the falling back procedure. Subsequently, in a release procedure, the eNB provides the notification associated with the falling back procedure to transition to a legacy paging scheme via an initial UE message.

Figure 10:
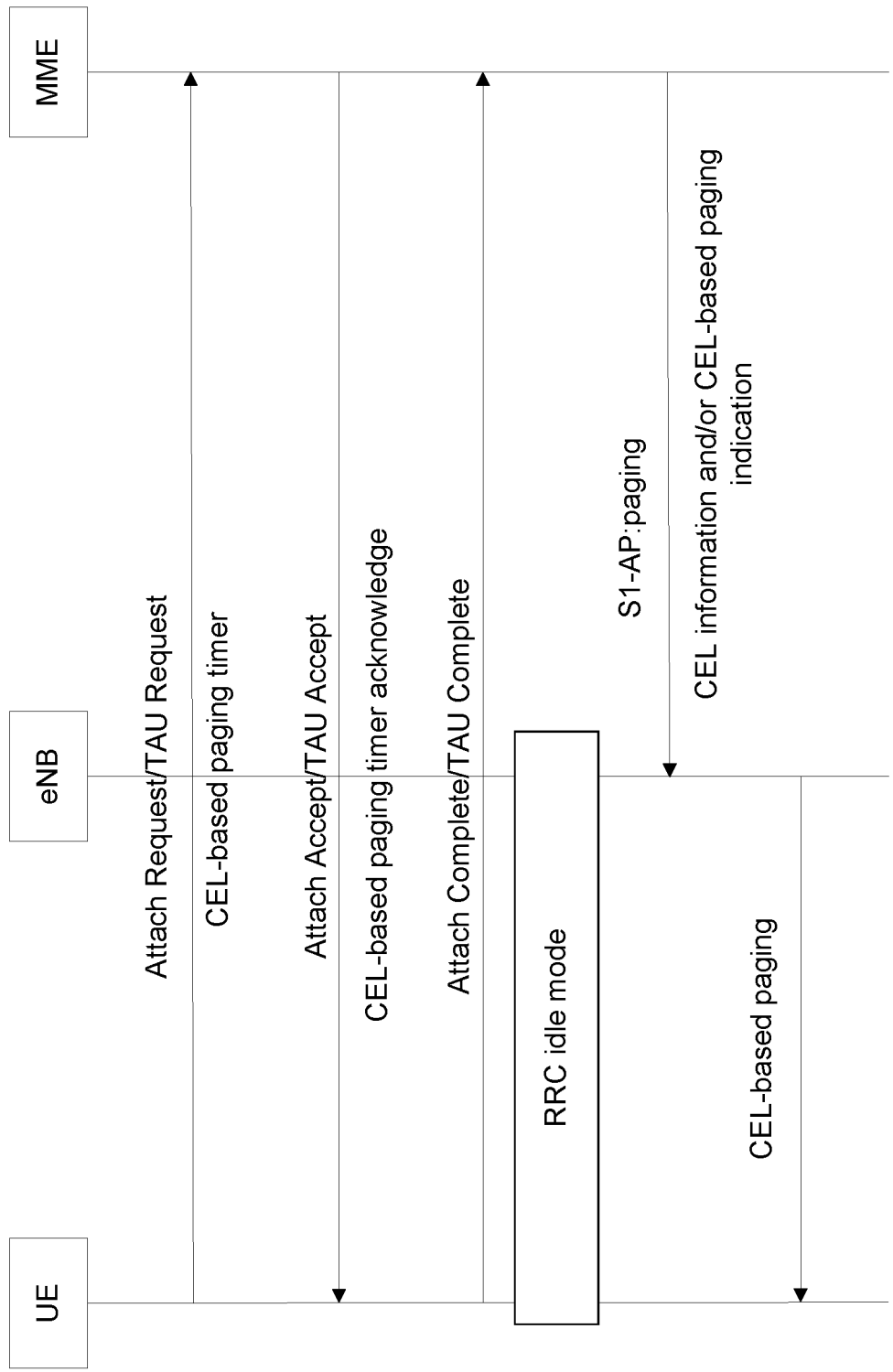
FIG. 10 shows an example of negotiating a timer of a coverage level based paging scheme with a mobility management entity (MME) based on some example embodiments of the disclosed technology.

FIG. 10 shows an example of negotiating a timer of a coverage level based paging scheme with a mobility management entity (MME) based on some example embodiments of the disclosed technology.

In some implementations, a user device (e.g., UE) negotiates a timer of the coverage level based paging scheme with the MME via an NAS procedure (Attach/TAU).

In some implementations, in the case where the coverage level based paging scheme is enabled between the UE and the MME, the UE and the MME negotiate the length of the timer and manage the timer. The UE provides the capability for the coverage level based paging scheme in Attach Request/TAU Request message as well as the length of the timer. The MME acknowledges the length of the timer via Attach Accept/TAU Accept message. If the timer expires, the coverage level based paging scheme may be transitioned back to the legacy paging scheme.

Figure 11:
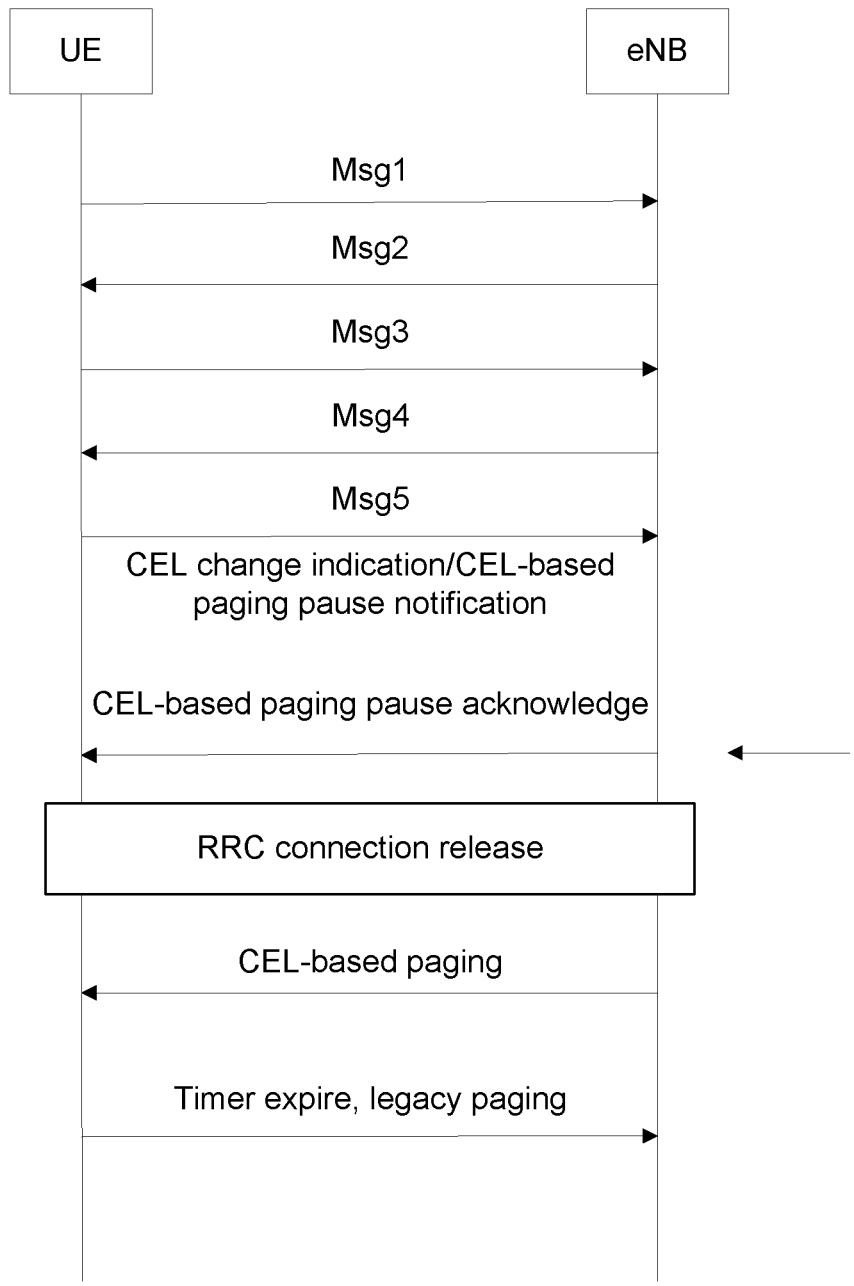
FIG. 11 shows an example of negotiating a timer of a coverage level based paging scheme with eNB based on some example embodiments of the disclosed technology.

FIG. 11 shows an example of negotiating a timer of a coverage level based paging scheme with eNB based on some example embodiments of the disclosed technology.

In some implementations, the UE negotiates the timer of coverage level based paging with eNB via an RRC establishment procedure. In the case where the coverage level based paging scheme is enabled between the UE and eNB, the UE and the eNB negotiate the length of the timer and manage the timer. The UE provides the capability for the coverage level based paging via messages in an RRC establishment procedure (e.g., Msg3/Msg5/RRCConnectionReestablishmentReques/RRCConnectionReconfigurationComplete) as well as the length of the timer. The eNB acknowledges the length of the timer via an RRC message (RRCConnectionReestablishment/RRCConnectionReconfiguration/RRCConnectionRelease). If the timer expires, the paging scheme is transitioned from the coverage level based paging scheme back to a legacy paging scheme.

In some implementations, a method for configuring paging related parameters may include configuring paging related parameter (e.g., DRX, npdcch-NumRepetitionPaging) for each paging carrier. In some implementations, a method for configuring paging related parameters may include configuring paging related parameter (e.g., DRX, npdcch-NumRepetitionPaging) for each CEL.

In configuring the paging related parameters (e.g., DRX, npdcch-NumRepetitionPaging) for each paging carrier, the eNB broadcasts the paging related parameters (e.g., DRX, npdcch-NumRepetitionPaging) for each paging carrier in SIB. The UE determines the paging related parameters to be used based on a formula associated with the paging carrier and receives paging messages based on the paging related parameters. The mapping relationship between paging carriers and paging related parameters is shown in Table 1 below.

TABLE 1

| Carrier_index | DRX | npdcch-NumRepetitionPaging |
|---|---|---|
| 1 | rfx | rx |
| 2 | rfy | ry |

In configuring paging related parameters (e.g., DRX, npdcch-NumRepetitionPaging) per CEL) for each CEK in the case where paging carriers are configured based on CEL, the UE determines the paging related parameters to be used based on the selected paging carrier and its CEL. The mapping relationship between coverage level values, paging carriers and paging related parameters is shown in Table 2 below. Here, "rfx" denotes x radio frame, "rx" denotes that the number of repetitions for paging is x.

TABLE 2

| CEL | Carrier_index | DRX | npdcch-NumRepetitionPaging |
|---|---|---|---|
| 1 | Carrier_x1, Carrier_y1, . . . | rfx | rx |
| 2 | Carrier_x2, Carrier_y2, . . . | rfy | ry |

In some embodiments of the disclosed technology, a method for enabling a coverage level based paging scheme may include the following operations:

The UE triggers a request procedure for a coverage level based paging scheme and/or a report procedure as to the capability for the coverage level based paging scheme via an NAS procedure (Attach/TAU).

The UE provides a capability report for the coverage level based paging scheme via an RRC establishment procedure.

The MME triggers a request procedure of the coverage level based paging scheme via an NAS procedure (Attach/TAU).

The MME triggers a request procedure of the coverage level based paging scheme via an NAS procedure (Detach).

In some implementations, the UE triggers a request procedure for a coverage level based paging scheme and/or a report procedure as to the capability for the coverage level based paging scheme via an NAS procedure (Attach/TAU). The UE may trigger a request procedure for a coverage level based paging scheme and/or a report procedure as to the capability for the coverage level based paging scheme via Attach Request/TAU Request message based on its mobility characteristics. For a stationary UE or a low-mobility UE, the UE can trigger the coverage level based paging operation.

In some implementations, the UE performs the report procedure as to the capability for the coverage level based paging scheme via an RRC establishment procedure. The UE provides capability information for paging schemes including coverage level based paging scheme and legacy paging scheme through Msg3/Msg5, and the eNB may forward the capability information to the MME via an initial UE message.

In some implementations, the MME triggers the request procedure of the coverage level based paging scheme via an NAS procedure (Attach/TAU). The MME triggers such a request procedure based on the mobility characteristics of the UE via Attach Accept/TAU Accept message. For a stationary UE or a low-mobility UE, the MME can trigger the coverage level based paging operation.

In some implementations, the MME triggers the request procedure of the coverage level based paging scheme via an NAS procedure (Detach). The MME triggers such a request procedure via Attach Accept/TAU Accept message based on the mobility characteristics of the UE. For a stationary UE or a low-mobility UE, the MME can trigger the coverage level based paging operation.

In some embodiments of the disclosed technology, a method for disabling coverage level based paging/notifying pausing coverage level based paging may include the following operations:

In some implementations, the UE triggers a disablement procedure of the coverage level based paging scheme and/or sends a notification for pausing the coverage level based paging operation via a TAU procedure, In some implementations, the UE triggers the disablement procedure of the coverage level based paging scheme and/or sends the notification for pausing the coverage level based paging operation in an RRC establishment procedure.

In some implementations, the UE triggers the disablement procedure of the coverage level based paging scheme and/or sends the notification for pausing the coverage level based paging operation via a TAU procedure, and the UE provides the information associated with the disablement of the coverage level based paging operation and the notification for pausing the coverage level based paging operation via the TAU request message and the MME acknowledges the reception of the information via a TAU Accept message.

In some implementations, the UE triggers the disablement procedure of the coverage level based paging scheme and/or sends the notification for pausing the coverage level based paging operation via an RRC establishment procedure. The UE provides the information associated with the disablement of the coverage level based paging operation and the notification for pausing the coverage level based paging operation via Msg3, Msg5 or a corresponding uplink (UL) data transmission. The eNB acknowledges the disablement procedure of the coverage level based paging scheme via an RRC message (RRCConnectionReestablishment/RRCConnectionReconfiguration) or a corresponding downlink (DL) data transmission.

In some embodiments of the disclosed technology, a method for falling back to a legacy paging scheme may include the following operations.

In some implementations, the UE provides an indication that the UE will transition from the coverage level based paging scheme back to the legacy paging scheme via Attach Request/TAU Request message in an NAS procedure (Attach/TAU), In some implementations, the eNB perceives a change in coverage level and triggers the falling back procedure to the legacy paging scheme via an RRC establishment procedure, In some implementations, the UE provides an indication regarding the falling back procedure toward the legacy paging scheme via Msg3 message in an EDT procedure.

In some implementations, the UE provides the indication regarding the falling back procedure toward the legacy paging scheme via Attach Request/TAU Request message in an NAS procedure (Attach/TAU), and the MME acknowledges the reception of the indication via Attach Accept/TAU Accept message.

In some implementations, when the eNB perceives the change in coverage level and triggers the falling back procedure toward the legacy paging scheme in RRC establishment procedure. In the case where the eNB stores the information related to the CEL, when the coverage level changes, the UE needs to initiate an RRC establishment, and the eNB may perceive the change in the coverage level by receiving Msg1 message and trigger the falling back procedure toward the legacy paging scheme.

In some implementations, the UE provides the indication regarding the falling back procedure toward the legacy paging scheme via Msg3 message in an EDT procedure. When the coverage level changes, the UE initiates the EDT procedure and provides the indication regarding the falling back procedure toward the legacy paging scheme via Msg3 message, and the eNB sends an acknowledgment message to the UE.

In some embodiments of the disclosed technology, a method for setting a timer of the coverage level based paging scheme may include the following operations.

In some implementations, the UE negotiates the timer of the coverage level based paging scheme with the MME via an NAS procedure (Attach/TAU).

In some implementations, the UE negotiates the timer of the coverage level based paging scheme with the eNB via an RRC establishment procedure.

In some implementations, the UE negotiates the timer of the coverage level based paging scheme with the MME via an NAS procedure (Attach/TAU). In the case where the coverage level based paging scheme is enabled between the UE and the MME, the UE and the MME negotiate the length of the timer and manage the timer. The UE provides the capability information for the coverage level based paging scheme via Attach Request/TAU Request message as well as the length of the timer. The MME acknowledges the length of the timer via Attach Accept/TAU Accept message. If the timer expires, the paging scheme may be transitioned from the coverage level based paging back to the legacy paging scheme.

In some implementations, the UE negotiates the timer of the coverage level based paging scheme with the eNB via an RRC establishment procedure. In the case where the coverage level based paging scheme is enabled between the UE and the eNB, the UE and the eNB negotiate the length of the timer and manage the timer. The UE provides the capability information for the coverage level based paging scheme in Msg3/Msg5/RRCConnectionReestablishmentReques/RRC-ConnectionReconfigurationComplete as well as the length of the timer. The eNB acknowledges the length of the timer via RRC message (RRCConnectionReestablishment/RRC-ConnectionReconfiguration). If the timer expires, the paging scheme may be transitioned from the coverage level based paging back to the legacy paging scheme.

In some embodiments of the disclosed technology, a method for paging related parameter configuration may include the following operations.

In some implementations, the method includes configuring paging related parameters (e.g., DRX, npdcch-Num-RepetitionPaging) for each paging carrier. In some implementations, the method includes configuring paging related parameters (e.g., DRX, npdcch-NumRepetitionPaging) for each coverage level value.

In some implementations, in configuring the paging related parameters (e.g., DRX, npdcch-NumRepetitionPaging) for each paging carrier, the eNB broadcasts the paging related parameters (e.g., DRX, npdcch-NumRepetitionPaging) for each paging carrier in SIB. The UE determines the paging related parameters to be used based on a formula associated with the paging carrier and receives paging messages based on the paging related parameters.

In some implementations, in configuring the paging related parameters (e.g., DRX, npdcch-NumRepetitionPaging) for each coverage level value, in the case where paging carriers are configured based on the CEL, the paging related parameters (e.g., DRX, npdcch-NumRepetitionPaging) are configured for each coverage level value. The UE determines the paging related parameters to be used based on the selected paging carrier and its CEL.

In some embodiments of the disclosed technology, a method for selecting a paging carrier in the coverage level based paging scheme may include the following operations.

In some implementations, a paging carrier is selected in a legacy paging carrier range.

In some implementations, a paging carrier is selected in the range of the paging carrier associated with the coverage level of the UE.

In some implementations, in selecting the paging carrier in the legacy paging carrier range, the UE and the eNB use the legacy formula for paging carrier selection in the legacy paging carrier range, after selecting paging carriers, if the coverage level configured for the selected paging carrier is inconsistent with the UE's coverage level value, the UE and the eNB will use the legacy paging scheme.

In some implementations, in selecting the paging carrier in the range of the paging carrier associated with the coverage level of the UE, if the coverage level of the UE is configured with more than one paging carrier, the UE and the eNB use the legacy formula for paging carrier selection in the range the range of the paging carrier associated with the coverage level of the UE. After selecting the paging carrier, the eNB sends paging messages on the selected paging carrier and the UE receives paging messages on the selected paging carrier.

In some embodiments of the disclosed technology, a method for selecting a paging carrier in the coverage level based paging scheme includes the following operations. In some implementations, a paging carrier is selected in the legacy paging carrier range. In some implementations, a paging carrier is selected in the range of the paging carrier associated with the coverage level of the UE.

In some implementations, in selecting a paging carrier in the legacy paging carrier range, the UE and the eNB use the legacy formula for paging carrier selection in the legacy paging carrier range. After selecting a paging carrier, if the coverage level configured for the selected paging carrier is inconsistent with the UE's coverage level, the UE and the eNB use the legacy paging scheme. If the coverage level configured for the selected paging carrier is consistent with the UE's coverage level, the UE and the eNB use the paging carrier to receive and transmit paging messages.

In some implementations, in selecting a paging carrier in the range of the paging carrier associated with the coverage level of the UE, if the coverage level of the UE is configured with more than one paging carrier, the UE and the eNB use the legacy formula for paging carrier selection in the range of the paging carrier associated with the coverage level of the UE. After selecting a paging carrier, the eNB sends a paging message on the selected paging carrier and the UE receives the paging message on the selected paging carrier.

Figure 12:
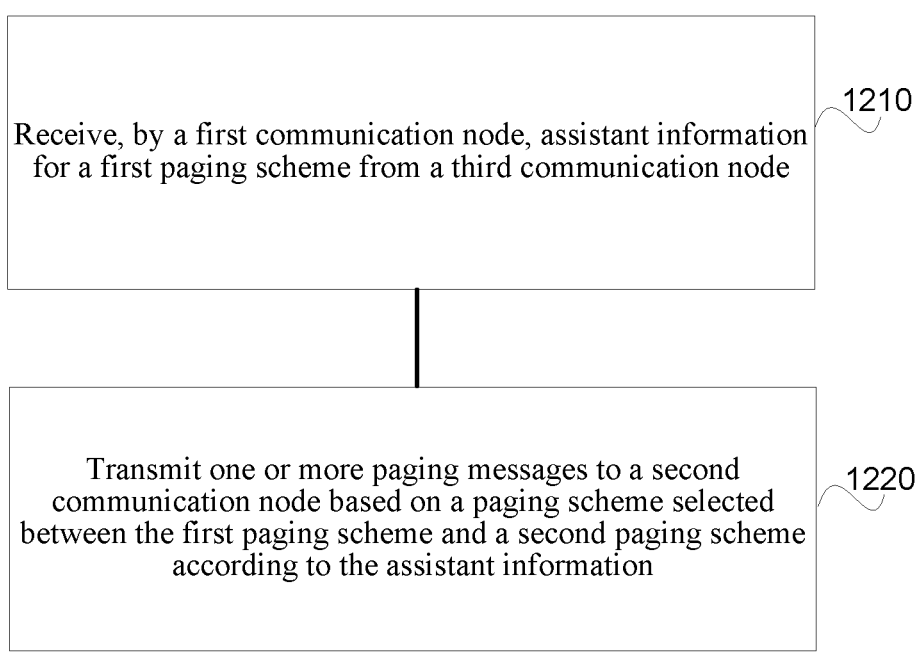
FIG. 12 shows an example of a process for wireless communication based on some example embodiments of the disclosed technology.

FIG. 12 shows an example of a process for wireless communication based on some example embodiments of the disclosed technology.

In some embodiments of the disclosed technology, a method of wireless communication 1200 includes, at 1210, receiving, by a first communication node, assistant information for a first paging scheme from a first communication node, and at 1220, transmitting one or more paging messages to a second communication node based on a paging scheme selected between the first paging scheme and a second paging scheme according to the assistant information.

Figure 13:
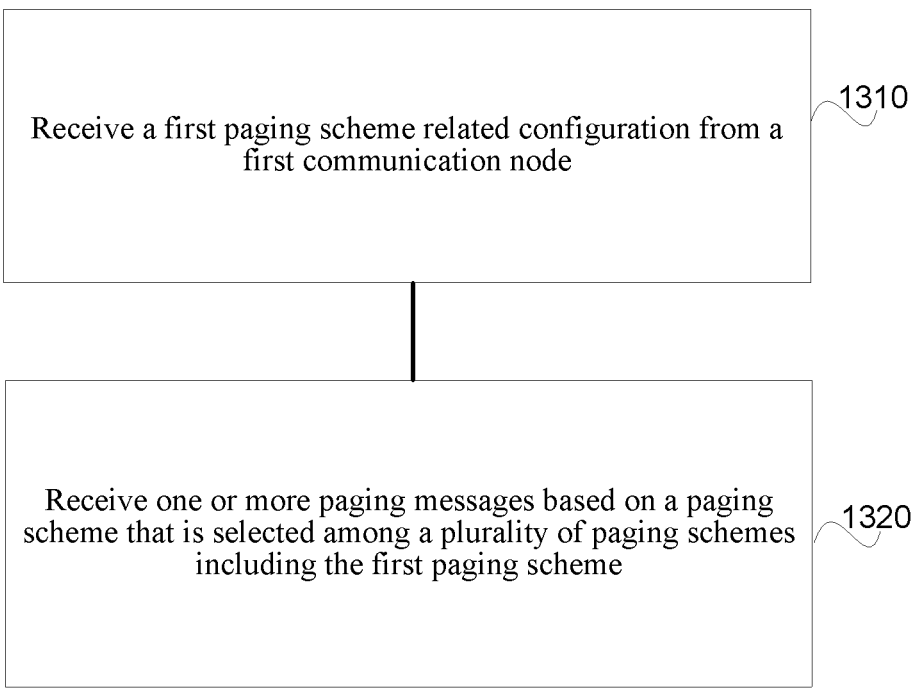
FIG. 13 shows another example of a process for wireless communication based on some example embodiments of the disclosed technology.

FIG. 13 shows another example of a process for wireless communication based on some example embodiments of the disclosed technology.

In some embodiments of the disclosed technology, a method of wireless communication 1300 includes, at 1310, receiving a first paging scheme related configuration from a first communication node, and at 1320, receiving one or more paging messages based on a paging scheme that is selected among a plurality of paging schemes including the first paging scheme.

Figure 14:
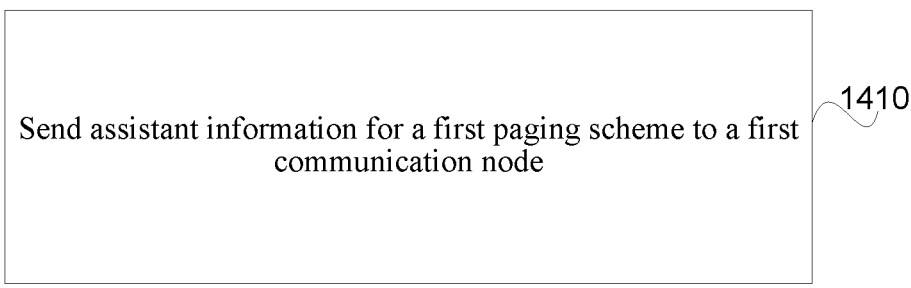
FIG. 14 shows another example of a process for wireless communication based on some example embodiments of the disclosed technology.

FIG. 14 shows another example of a process for wireless communication based on some example embodiments of the disclosed technology.

In some embodiments of the disclosed technology, a method of wireless communication 1400 includes, at 1410, sending assistant information for a first paging scheme to a first communication node.

In the context of this patent document, the word "first paging scheme" may be used to indicate a coverage level based paging scheme. In some implementations, the word "first communication node" can be used to indicate eNB or gNB, the word "second communication node" can be used to indicate user equipment (UE), and the word "third communication node" can be used to indicate a mobility management entity (MME) or a mobility management function (AMF).

Figure 15:
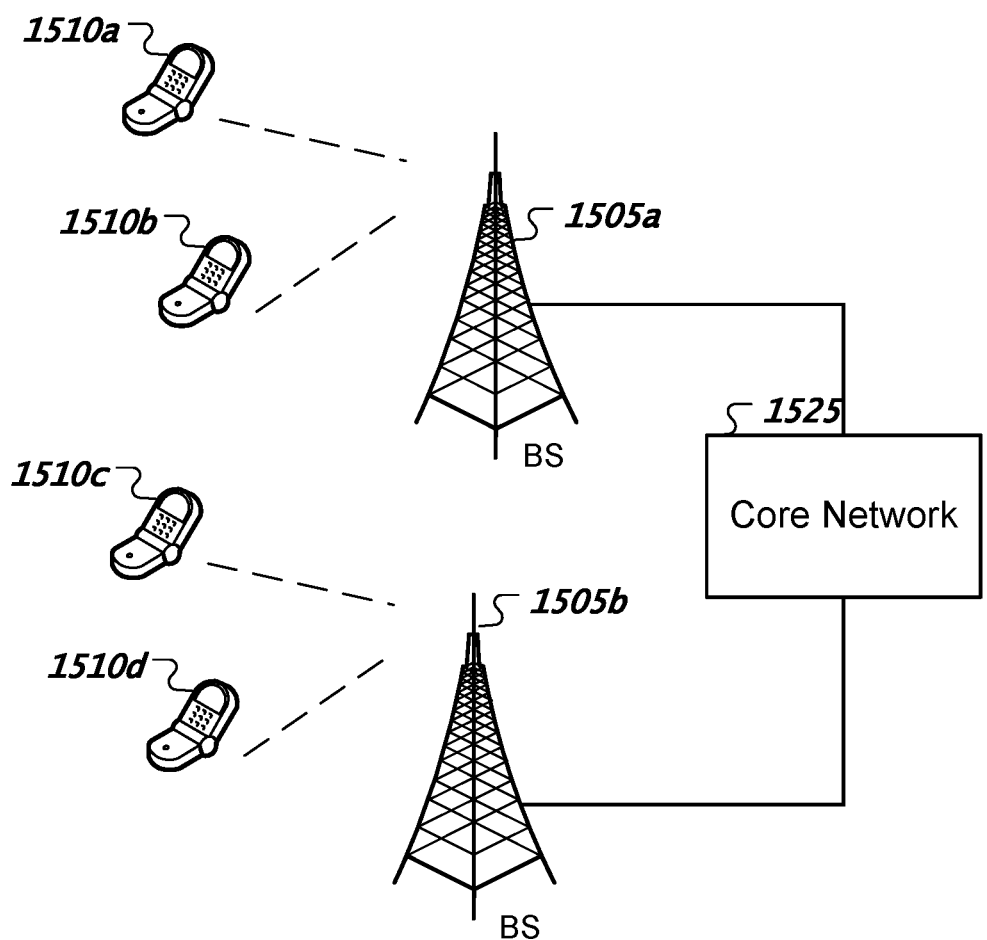
FIG. 15 shows a wireless communication system based on some example embodiments of the disclosed technology.

FIG. 15 shows an example of a wireless communication system 1500 where techniques in accordance with one or more embodiments of the present technology can be applied. A wireless communication system 1500 can include one or more base stations (BSs) 1505a, 1505b, one or more wireless devices 1510a, 1510b, 1510c, 1510d, and a core network 1525. A base station 1505a, 1505b can provide wireless service to wireless devices 1510a, 1510b, 1510c and 1510d in one or more wireless sectors. In some implementations, a base station 1505a, 1505b includes directional antennas to produce two or more directional beams to provide wireless coverage in different sectors.

The core network 1525 can communicate with one or more base stations 1505a, 1505b. The core network 1525 provides connectivity with other wireless communication systems and wired communication systems. The core network may include one or more service subscription databases to store information related to the subscribed wireless devices 1510a, 1510b, 1510c, and 1510d. A first base station 1505a can provide wireless service based on a first radio access technology, whereas a second base station 1505b can provide wireless service based on a second radio access technology. The base stations 1505a and 1505b may be co-located or may be separately installed in the field according to the deployment scenario. The wireless devices 1510a, 1510b, 1510c, and 1510d can support multiple different radio access technologies. The techniques and embodiments described in the present document may be implemented by the base stations of wireless devices described in the present document.

Figure 16:
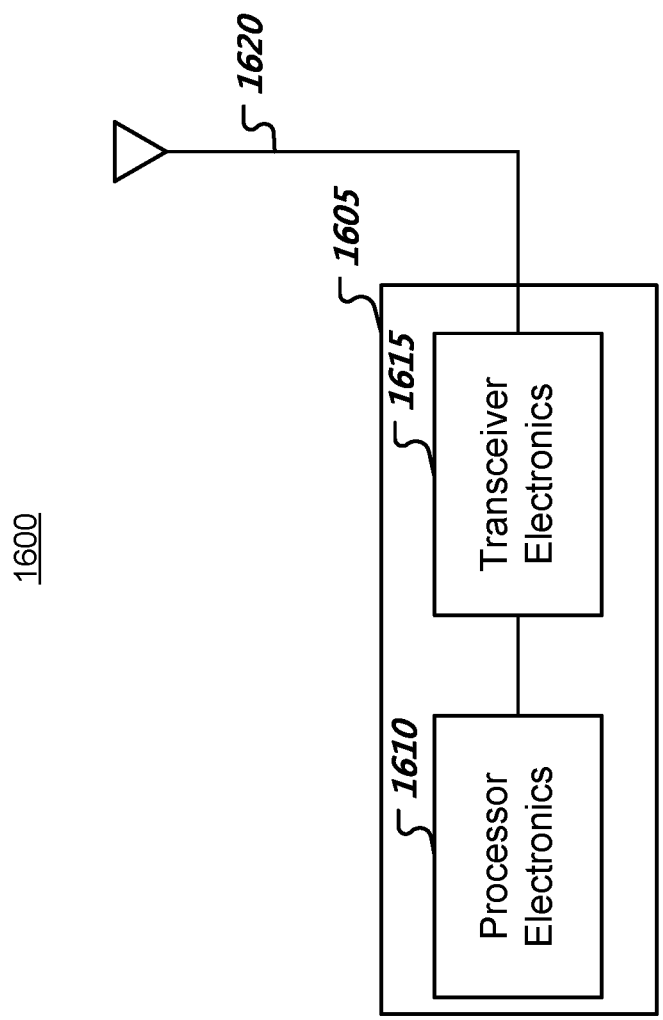
FIG. 16 shows a block diagram of a portion of a radio system based on some example embodiments of the disclosed technology.

FIG. 16 is a block diagram representation of a portion of a radio station in accordance with one or more embodiments of the present technology can be applied. A radio 1605 such as a base station or a wireless device (or UE) can include processor electronics 1610 such as a microprocessor that implements one or more of the wireless techniques presented in this document. The radio 1605 can include transceiver electronics 1615 to send and/or receive wireless signals over one or more communication interfaces such as antenna 1620. The radio 1605 can include other communication interfaces for transmitting and receiving data. Radio 1605 can include one or more memories (not explicitly shown) configured to store information such as data and/or instructions. In some implementations, the processor electronics 1610 can include at least a portion of the transceiver electronics 1615. In some embodiments, at least some of the disclosed techniques, modules or functions are implemented using the radio 1605. In some embodiments, the radio 1605 may be configured to perform the methods described in this document.

It will be appreciated that the present document discloses techniques that can be embodied in various embodiments to establish and manage multicast sessions in various scenarios. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as base stations. A network node includes a base station including a next generation Node B (gNB), enhanced Node B (eNB), or any other device that performs as a base station. A resource range may refer to a range of time-frequency resources or blocks.

Clause 1. A method of wireless communication, comprising: receiving, by a first communication node, assistant information for a first paging scheme from a third communication node; and transmitting one or more paging messages to a second communication node based on a paging scheme selected between the first paging scheme and a second paging scheme according to the assistant information.

Clause 2. The method of clause 1, wherein the assistant information includes at least one of a type of the first communication node, an indication as to whether the first paging scheme or the second paging scheme is supported, or a coverage level of the first communication node.

Clause 3. The method of clause 2, wherein the type of the first communication node includes at least one of an indication as to whether the first communication node is stationary or nonstationary or an indication as to whether the first communication node is configured to support the first paging scheme.

Clause 4. The method of any of clauses 2-3, wherein the first paging scheme is configured to transmit or receive one or more paging messages based on a paging parameter configuration related to a coverage level.

Clause 5. The method of clause 4, wherein the first communication node is configured to send the coverage level related paging parameter configuration in a system information block (SIB).

Clause 6. The method of clause 5, wherein the coverage level related paging parameter configuration includes at least one of paging discontinuous reception (DRX), a maximum number of repetitions of physical downlink control channel (PDCCH) for paging, a cycle of PDCCH for paging, or an offset of subframe of PDCCH for paging.

Clause 7. The method of any of clauses 2-3, wherein the second paging scheme is configured to transmit or receive one or more paging messages based on a cell-specific paging parameter configuration.

Clause 8. The method of clause 7, wherein the first communication node is configured to send the cell-specific paging parameter configuration in a system information block (SIB).

Clause 9. The method of clause 1, wherein the paging scheme is selected based on the assistant information and a paging related configuration in a system information block (SIB).

Clause 10. The method of clause 1, wherein the first paging scheme is selected upon determination that the first communication node supports the first paging scheme and the second communication node enables the first paging scheme according to the assistant information provided by the third communication node.

Clause 11. The method of clause 1, wherein, upon determination that the selected paging scheme is the first paging scheme, the first communication node sends one or more paging messages to the second communication node based on a coverage level specific paging parameter configuration according to UE coverage level of the second communication node.

Clause 12. A method of wireless communication, comprising: receiving a first paging scheme related configuration from a first communication node; and receiving one or more paging messages based on a paging scheme that is selected among a plurality of paging schemes including the first paging scheme.

Clause 13. The method of clause 12, wherein the first paging scheme related configuration includes an indication of supporting the first paging scheme.

Clause 14. The method of clause 12, wherein the first paging scheme related configuration includes a coverage level related paging parameter configuration including at least one of paging discontinuous reception (DRX), a maximum number of repetitions of physical downlink control channel (PDCCH) for paging, a cycle of PDCCH for paging, or an offset of subframe of PDCCH for paging.

Clause 15. The method of clause 12, wherein the selection of paging scheme includes selecting the first paging scheme if the first communication node and a second communication node have received a response message acknowledging a request for the first paging scheme from a third communication node.

Clause 16. The method of clause 12, wherein the selection of paging scheme includes selecting the first paging scheme if the first communication node supports the first paging scheme, a second communication node has received a response message acknowledging a request for the first paging scheme from a third communication node, and a timer of the first paging scheme is not expired.

Clause 17. The method of any of clauses 15-16, wherein the request for the first paging scheme includes transmitting a request message to the third communication node by an attach request or a tracking area update (TAU) request via a non-access stratum (NAS) procedure.

Clause 18. The method of clause 17, further comprising receiving a response message acknowledging the request for the first paging scheme or rejecting the first paging scheme.

Clause 19. The method of clause 16, wherein the timer of the first paging scheme includes a starting point in time of the first paging scheme and a time duration for the first paging scheme.

Clause 20. The method of clause 16, wherein ae starting point in time of the first paging scheme is determined based on at least one of when the first communication node is released to a radio resource control (RRC) idle mode or a response message acknowledging the first paging scheme.

Clause 21. The method of any of clauses 15-16, wherein, upon enabling the first paging scheme, a second communication node triggers a release procedure when a coverage level of the first communication node changes, the timer of the first paging scheme expires, or a reference signal receiving power (RSRP) exceeds a preset value.

Clause 22. The method of clause 21, wherein the release procedure includes sending a notification for requesting an end of the first paging scheme by Msg3 or Msg5 in a radio resource control (RRC) establishment procedure.

Clause 23. A method of wireless communication, comprising: sending assistant information for a first paging scheme to a first communication node.

Clause 24. The method of clause 23, wherein the assistant information includes at least one of a type of a second communication node, an indication associated with a paging scheme including the first paging scheme or a second paging scheme, or a coverage level of the second communication node.

Clause 25. The method of clause 24, wherein the type of the second communication node includes whether the second communication node is stationary or nonstationary, and whether to support the first paging scheme or not.

Clause 26. The method of clause 23, wherein the first paging scheme is configured to send or receive paging messages based on a coverage level related paging parameter configuration.

Clause 27. The method of clause 23, wherein the second paging scheme is configured to send or receive paging messages based on a cell specific paging parameter configuration.

Clause 28. The method of clause 23, wherein a second communication node is configured to enable the first paging scheme if a third communication node sends an acknowledgement message to the second communication node with respect to a request for the first paging scheme, and a timer for the first paging scheme is not expired.

Clause 29. The method of clause 23, wherein a second communication node is configured to enable the first paging scheme if a third communication node sends an acknowledgement message to the second communication node with respect to a request for the first paging scheme.

Clause 30. The method of any of clauses 28-29, wherein the sending of the acknowledgement message to the second communication node includes sending an acknowledgement message to the second node when receiving the request for the first paging scheme from the second communication node by an attach request or a tracking area update (TAU) request via a non-access stratum (NAS) procedure.

Clause 31. An apparatus for wireless communication, comprising a memory and a processor, wherein the processor reads code from the memory and implements a method recited in any of clauses 1 to 30.

Clause 32. A computer readable program storage medium having code stored thereon, the code, when executed by a processor, causing the processor to implement a method recited in any of clauses 1 to 30.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of wireless communication, comprising:
receiving, by a base station, from a mobility management entity, assistant information for a first paging scheme for transmitting or receiving one or more paging messages based on a paging parameter configuration related to a coverage level of a wireless device; and
transmitting, by the base station, one or more paging messages to the wireless device based on a paging scheme selected between the first paging scheme for transmitting or receiving one or more paging messages based on the coverage level of the wireless device and a second paging scheme for transmitting or receiving one or more paging messages based on a cell-specific paging parameter configuration, according to the assistant information,
wherein the assistant information includes at least one of a type of the wireless device, an indication as to whether the first paging scheme or the second paging scheme is supported, or a coverage level of the wireless device, and
wherein the type of the wireless device includes at least one of an indication as to whether the wireless device is stationary or nonstationary or an indication as to whether the wireless device is configured to support the first paging scheme,
wherein the first paging scheme is selected upon determination that the base station supports the first paging scheme and the wireless device enables the first paging scheme according to the assistant information provided by the mobility management entity, wherein the first paging scheme is triggered by the wireless device or the mobility management entity, wherein the wireless device is configured to trigger the first paging scheme by transmitting, to the mobility management entity, an attach request message via a non-access stratum (NAS) procedure, wherein the mobility management entity is configured to trigger the first paging scheme by transmitting, to the wireless device, a detach accept message via the NAS procedure in response to a detach request message sent by the wireless device, wherein the attach request message and the detach accept message are generated based on a mobility characteristic of the wireless device that indicates whether the wireless device is stationary or nonstationary.

2. The method of claim 1, wherein the first paging scheme is configured to transmit or receive one or more paging messages based on a paging parameter configuration related to a coverage level, and wherein the base station is configured to send the coverage level related paging parameter configuration in a system information block (SIB).

3. The method of claim 2, wherein the coverage level related paging parameter configuration includes at least one of paging discontinuous reception (DRX), a maximum number of repetitions of physical downlink control channel (PDCCH) for paging, a cycle of PDCCH for paging, or an offset of subframe of PDCCH for paging.

4. The method of claim 1, wherein the second paging scheme is configured to transmit or receive one or more paging messages based on a cell-specific paging parameter configuration, and wherein the base station is configured to send the cell-specific paging parameter configuration in a system information block (SIB).

5. The method of claim 1, wherein the paging scheme is selected based on the assistant information and a paging related configuration in a system information block (SIB).

6. The method of claim 1, wherein, upon determination that the selected paging scheme is the first paging scheme, the base station sends one or more paging messages to the wireless device based on a coverage level specific paging parameter configuration according to a coverage level of the wireless device.

7. An apparatus for wireless communication, comprising a memory and a processor, wherein the processor reads code from the memory and implements the method recited in claim 1.

8. A method of wireless communication, comprising:
receiving, by a wireless device, from a base station, a configuration related to a first paging scheme for transmitting or receiving one or more paging messages based on a paging parameter configuration related to a coverage level of a wireless device;
receiving, by the wireless device, one or more paging messages based on a paging scheme that is selected between the first paging scheme for transmitting or receiving one or more paging messages based on the coverage level of the wireless device and a second paging scheme for transmitting or receiving one or more paging messages based on a cell-specific paging parameter configuration,
wherein the first paging scheme is selected upon determination that the base station supports the first paging scheme and the wireless device enables the first paging scheme,
wherein the first paging scheme is triggered by the wireless device or a mobility management entity; and triggering, by the wireless device, the first paging scheme by transmitting, to a mobility management entity, an attach request that is generated based on a mobility characteristic of the wireless device indicating whether the wireless device is stationary or nonstationary,
wherein the mobility management entity is configured to trigger the first paging scheme by transmitting, to the wireless device, a detach accept message via the NAS procedure in response to a detach request message sent by the wireless device, wherein the detach accept message is generated based on a mobility characteristic of the wireless device that indicates whether the wireless device is stationary or nonstationary.

9. The method of claim 8, wherein the first paging scheme related configuration includes an indication of supporting the first paging scheme.

10. The method of claim 8, wherein the first paging scheme related configuration includes a coverage level related paging parameter configuration including at least one of paging discontinuous reception (DRX), a maximum number of repetitions of physical downlink control channel (PDCCH) for paging, a cycle of PDCCH for paging, or an offset of subframe of PDCCH for paging.

11. The method of claim 8, wherein the selection of paging scheme includes selecting the first paging scheme in a case that the base station and a wireless device have received a response message acknowledging a request for the first paging scheme from the mobility management entity, or in a case that the base station supports the first paging scheme, a wireless device has received a response message acknowledging a request for the first paging scheme from the mobility management entity, and a timer of the first paging scheme is not expired.

12. The method of claim 11, further comprising receiving a response message acknowledging the request for the first paging scheme or rejecting the first paging scheme.

13. The method of claim 11, wherein the timer of the first paging scheme includes a starting point in time of the first paging scheme and a time duration for the first paging scheme.

14. The method of claim 11, wherein a starting point in time of the first paging scheme is determined based on at least one of when the base station is released to a radio resource control (RRC) idle mode or a response message acknowledging the first paging scheme.

15. The method of claim 11, wherein, upon enabling the first paging scheme, a wireless device triggers a release procedure when a coverage level of the base station changes, the timer of the first paging scheme expires, or a reference signal receiving power (RSRP) exceeds a preset value.

16. An apparatus for wireless communication, comprising a memory and a processor, wherein the processor reads code from the memory and implements the method recited in claim 8.

17. A method of wireless communication, comprising:
sending, by a mobility management entity, to a base station, assistant information for a first paging scheme for transmitting or receiving one or more paging messages based on a paging parameter configuration related to a coverage level of a wireless device,
wherein the assistant information includes at least one of a type of a wireless device, an indication associated with a paging scheme including the first paging scheme for transmitting or receiving one or more paging messages based on the coverage level of the wireless device or a second paging scheme for transmitting or receiving one or more paging messages based on a cell-specific paging parameter configuration, or a coverage level of the wireless device, wherein the type of the wireless device includes whether the wireless device is stationary or nonstationary, and whether to support the first paging scheme or not, wherein the first paging scheme is selected upon determination that the base station supports the first paging scheme and the wireless device enables the first paging scheme according to the assistant information provided by the mobility management entity, wherein the first paging scheme is triggered by the wireless device or the mobility management entity; and triggering, by the mobility management entity, the first paging scheme by transmitting, to the wireless device, in response to a detach request message sent by the wireless device, a detach accept message that is generated based on a mobility characteristic of the wireless device indicating whether the wireless device is stationary or nonstationary, wherein the wireless device is configured to trigger the first paging scheme by transmitting, to the mobility management entity, an attach request message via a non-access stratum (NAS) procedure, wherein the attach request message is generated based on a mobility characteristic of the wireless device that indicates whether the wireless device is stationary or nonstationary.

18. The method of claim 17, wherein the first paging scheme is configured to send or receive paging messages based on a coverage level related paging parameter configuration.

19. The method of claim 17, wherein the second paging scheme is configured to send or receive paging messages based on a cell specific paging parameter configuration.

20. The method of claim 17, wherein the wireless device is configured to enable the first paging scheme in a case that the mobility management entity sends an acknowledgement message to the wireless device with respect to a request for the first paging scheme, and a timer for the first paging scheme is not expired, or in a case that the mobility management entity sends an acknowledgement message to the wireless device with respect to a request for the first paging scheme.

21. The method of claim 20, wherein the sending of the acknowledgement message to the wireless device includes sending an acknowledgement message to the wireless device when receiving the request for the first paging scheme from the wireless device by the attach request message via the NAS procedure.

22. An apparatus for wireless communication, comprising a memory and a processor, wherein the processor reads code from the memory and implements the method recited in claim 17.

* * * * *